Jan. 23, 1923. 1,443,308
H. B. CLARK.
AUTOMATIC LATCH MECHANISM FOR CLUTCH CONTROL FOR FORD AND OTHER TRACTORS.
FILED MAR. 22, 1921.
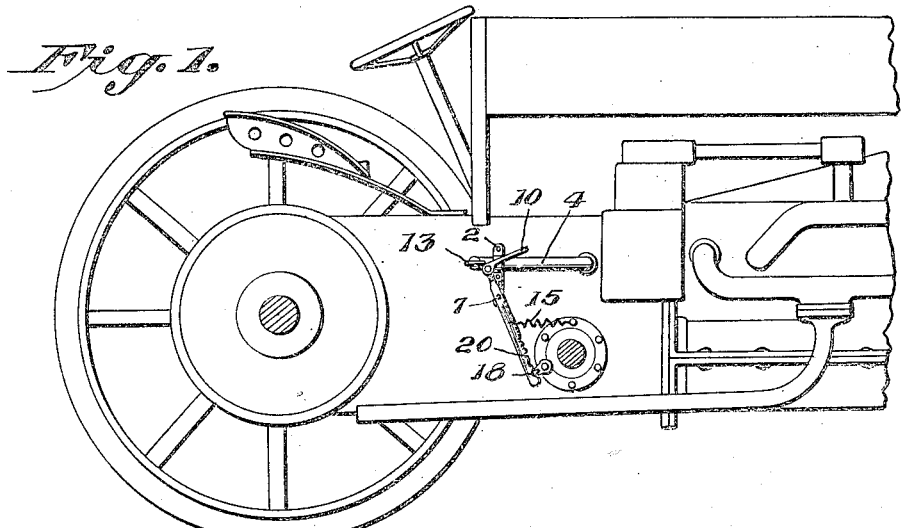
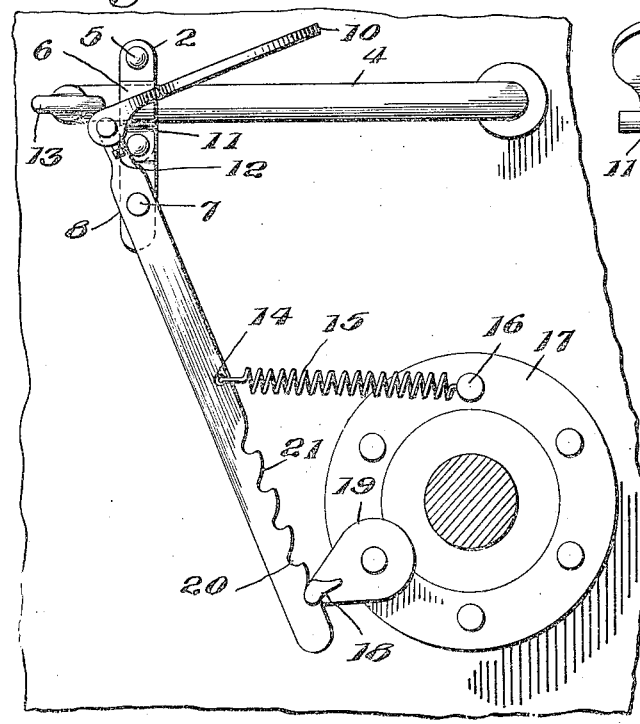
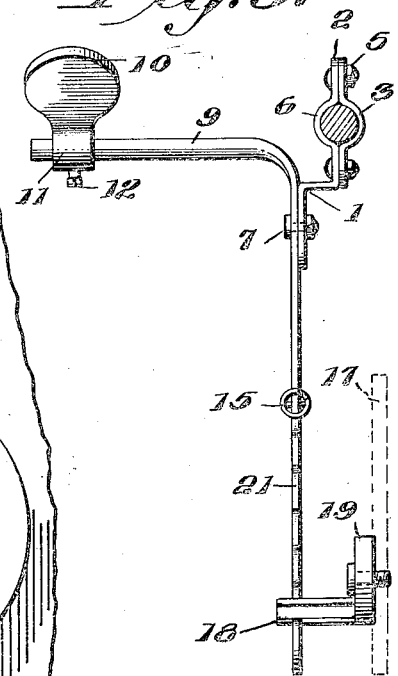
Inventor
Henry Burr Clark
Witness:
Robert F. Beck
By
Attorney Patented Jan. 23, 1923.

1,443,308

UNITED STATES PATENT OFFICE.

HENRY BURR CLARK, OF MOSHERVILLE, MICHIGAN.

AUTOMATIC LATCH MECHANISM FOR CLUTCH CONTROL FOR FORD AND OTHER TRACTORS.

Application filed March 22, 1921. Serial No. 454,531.

*To all whom it may concern:*

Be it known that I, HENRY BURR CLARK, a citizen of the United States, residing at Mosherville, in the county of Hillsdale and State of Michigan, have invented new and useful Improvements in Automatic Latch Mechanism for Clutch Control for Ford and Other Tractors, of which the following is a specification.

The invention relates to an automatic latch mechanism for clutch control for Ford and other tractors.

The object of the present invention is to provide a simple, practical and efficient automatic latch mechanism designed particularly to be applied to the clutch control lever of a Ford tractor but adapted to be also advantageously employed on clutches of various types of tractors and capable of automatically latching and holding the clutch pedal arm when the same is depressed and of also enabling the same to be readily released by a slight pressure on the latch mechanism.

A further object of the invention is to provide a clutch control lever latch mechanism of this character adapted to be easily and quickly applied to the clutch pedal arm and the pulley bracket of a Ford tractor or similar machine and capable also of ready adjustment to arrange the pedal of the latch mechanism in convenient position for operation so that it will not be necessary for the operator to remove his foot from the clutch lever when it is desired to operate the latch mechanism.

With these and other objects in view the invention consists in the novel construction, combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing in which like characters of reference designate corresponding parts in the several figures;

Figure 1 is a side elevation of a portion of Ford tractor provided with clutch control latch mechanism constructed in accordance with this invention.

Figure 2 is an enlarged side view of the latch mechanism showing the same applied to the latch pedal arm and the pulley bracket.

Figure 3 is an end elevation of the same.

Referring to the drawing in which is illustrated the preferred embodiment of the invention, the automatic latch mechanism comprises in its construction a latch lever supporting bracket 1 of approximately L-shape, provided at the top with an upwardly extending clamp 2 having a removable section or member 3 and secured to the clutch pedal arm 4 of a tractor by bolts 5 or other suitable fastening means. The clamp 2 comprises the removable sectional member 3 and an integral sectional member 6 formed integral with the bracket 1 and the two sections or members are bowed or bent outwardly to conform to the configuration of the clutch pedal arm 4 and firmly clamp the same as clearly illustrated in Figure 3, of the drawing. The bracket 1 extends laterally from the lower end of the integral section 6 of the clamp and then downwardly, the depending portion carrying a pivot 7 on which is mounted a latch lever 8 consisting of a straight bar or member having its upper portion 9 bent horizontally and extended laterally and rounded to receive a latch pedal 10. The latch pedal 10 is provided with a shank 11 through which passes the rounded extension of the upper portion of the latch lever and the said pedal is adjustably secured to the rounded lateral extension or stem by a clamping screw 12. The pedal is adapted to be moved inwardly and outwardly with respect to the bracket 1 to arrange it in proper position with relation to the clutch pedal 13 to enable the latch mechanism to be readily operated without necessitating the operator entirely removing his foot from the pedal 13 of the clutch arm 4. The pivot 7 is located adjacent the upper end of the straight body portion of the latch lever and forms a short upper arm and a relatively long lower arm of the said latch lever. The pedal 10 of the latch mechanism extends rearwardly from the stem or extension 4 and is set at substantially right angles to the body portion of the lever 8 as clearly illustrated in Figure 2 of the drawing.

The lower relatively long arm of the latch lever is provided intermediate of its end with a perforation 14 into which is hooked one end of a coiled spring 15 which has its other end attached to one of the fastening devices 16 of the pulley bracket 17 of the tractor and the said spring is adapted to maintain the lower portion of the latch lever normally in engagement with a fixed projecting arm 18 of a latch plate or member 19. The latch plate or member 19 which is also secured to the pulley bracket 17 by one of the fastening devices thereof forms with the laterally projecting arm 18, a keeper adapted to engage any one of a plurality of notches 20 formed in the lower portion of the latch lever and arranged at intervals along the same. The notches form shoulders and connecting inclined portions 21 which enable the latch lever to readily slide over the keeper arm 18 when the clutch pedal 13 is depressed. This will automatically lock the clutch pedal in its depressed position while the gears of the tractor are being shifted and when it is desired to release the clutch pedal and permit the clutch to move to its engaging position, a slight pressure on the latch pedal 10 will swing the latch lever out of engagement with the fixed projecting arm 18 and release the clutch pedal arm. This operation may be readily effected by simply shifting the foot without removing the same from the clutch pedal as the latch pedal extends rearwardly from a point adjacent to the clutch pedal and may be readily adjusted to suit the convenience of the operator.

What is claimed is:

1. In a latch mechanism for tractor clutches, the combination with a laterally extending clutch pedal having a forwardly extending arm disposed longitudinally of the tractor, of a latch lever normally arranged in substantially an inclined position and pivoted intermediate of its ends below and in advance of the clutch pedal and provided at the upper end with a pedal located in advance of the clutch pedal so as to be engaged by the foot of the operator without necessitating the removal of the same from the clutch pedal, said latch lever being also provided at its lower portion with a plurality of notches, a fixed latch member or keeper arranged in advance of and adapted to be engaged by the notched lower portion of the latch lever, a spring connected with the latch lever for normally urging the lower portion of the same into engagement with the fixed latch member or keeper, and means for mounting the latch lever on the arm of the clutch pedal.

2. In a latch mechanism for tractor clutches, the combination with a laterally extending clutch pedal provided with an arm extending longitudinally of the tractor, of a bracket mounted on the said arm and adjustable along the same longitudinally of the tractor, a latch lever pivoted at its upper portion to the said bracket and provided above the pivotal point with a pedal located in advance of the pedal of the clutch lever in position to be engaged by the foot of the operator without removing the same from the clutch lever pedal, said latch lever extending downwardly from the bracket and provided in its lower portion with a plurality of notches, a fixed latch member or keeper arranged to be engaged by the lower portion of the latch lever, and a spring connected with the latch lever for normally urging the same into engagement with the fixed latch member or keeper.

3. A latch mechanism for tractor clutches including a substantially L-shaped bracket provided at its upper portion with a clamp for engaging a clutch pedal arm, said bracket extending laterally and then downwardly from the clamp, and provided at its downwardly extending portion with a pivot, a latch lever mounted on the said pivot to form upper and lower arms and having its upper arm bent horizontally and extended laterally, a latch pedal mounted on the extension of the lever and extending rearwardly therefrom and adjustable to enable it to be arranged adjacent the clutch pedal, a fixed latch member or keeper and means for urging the lower arm of the latch lever into engagement with the fixed latch member or keeper.

4. A latch mechanism for tractor clutches including a substantially L-shaped bracket provided at its upper portion with a clamp for engaging a clutch pedal arm, said bracket extending laterally and then downwardly from the clamp, and provided at its downwardly extending portion with a pivot, a latch lever mounted on the said pivot to form upper and lower arms and having its upper arm bent horizontally and extended laterally, a latch pedal mounted on the extension of the lever and extending rearwardly therefrom and adjustable to enable it to be arranged adjacent the clutch pedal, said latch lever being also provided at its lower portion with notches arranged at intervals, a fixed latch member or keeper provided with a rearwardly projecting arm arranged to be engaged by the notches of the latch lever, and a spring connected with the latch lever for urging the same into engagement with the fixed latch member or keeper.

In testimony whereof I have hereunto set my hand.

HENRY BURR CLARK.